No. 708,014. Patented Sept. 2, 1902.
S. BLAGDEN.
OYSTER OPENING TOOL.
(Application filed Apr. 29, 1902.)
(No Model.)
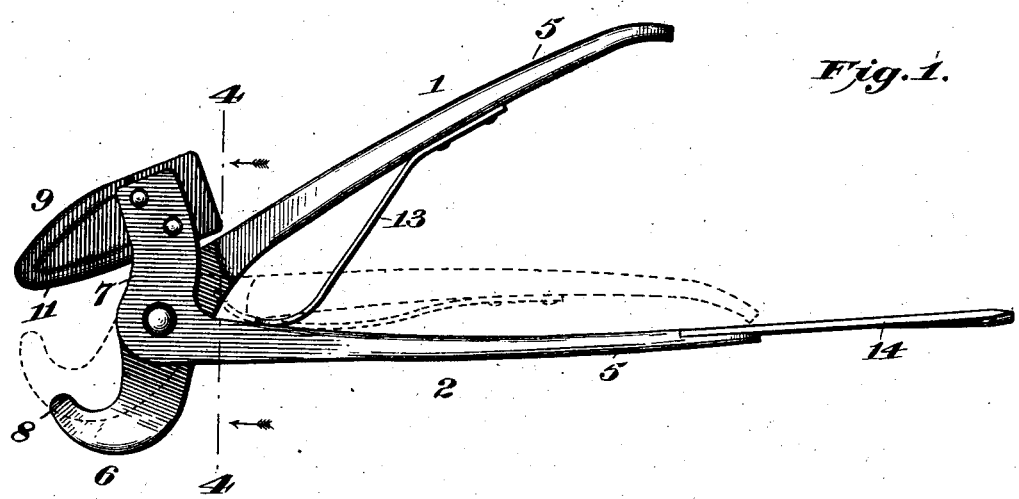
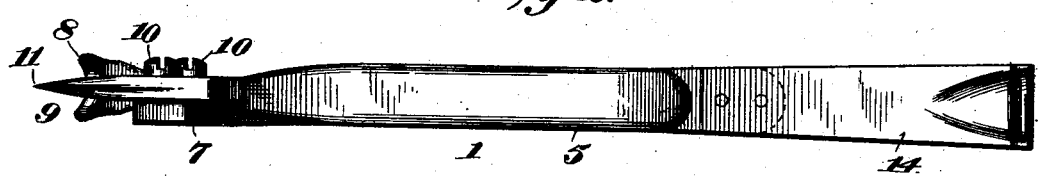
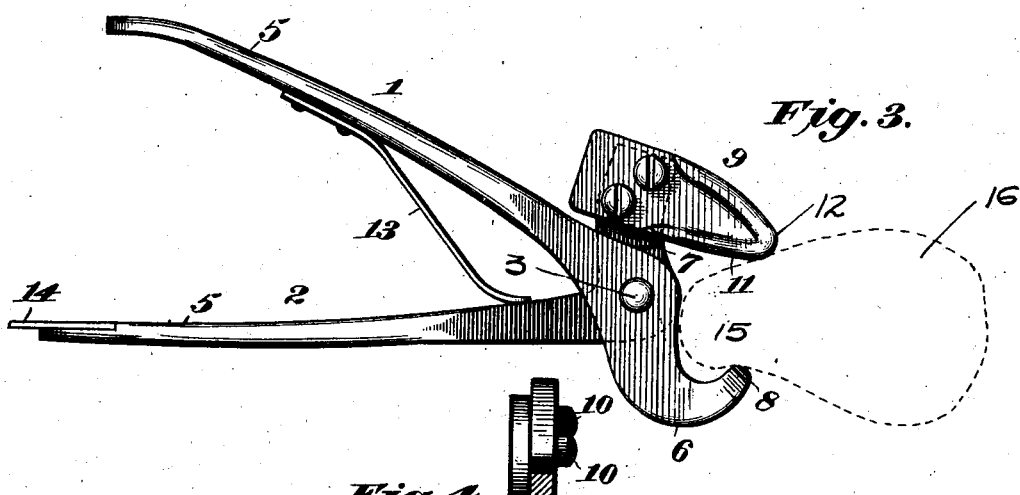
Witnesses
Elmer Seavey
R. W. Bishop
Inventor
Silliman Blagden
By E. W. Cady
Attorney

UNITED STATES PATENT OFFICE.

SILLIMAN BLAGDEN, OF BOSTON, MASSACHUSETTS.

OYSTER-OPENING TOOL.

SPECIFICATION forming part of Letters Patent No. 708,014, dated September 2, 1902.

Application filed April 29, 1902. Serial No. 105,183. (No model.)

*To all whom it may concern:*

Be it known that I, SILLIMAN BLAGDEN, a citizen of the United States, residing at Boston, in the county of Middlesex and State of Massachusetts, have invented a new and useful Oyster-Opening Tool, of which the following is a specification.

This invention relates to devices for opening oysters, and has for its object to provide a tool by means of which oysters may not only be easily and readily opened, but also by means of which the scattering of broken pieces of shell on oysters served on the half-shell is avoided. As oysters are ordinarily shucked when they are served on the half-shell it is very common to find pieces of broken shell in the oyster, which is not only disagreeable to the eater in having the pieces of shell in the mouth and being obliged to eject them, but also in many cases it is injurious, where the pieces of shell are inadvertently swallowed with the oyster, thereby subsequently occasioning internal troubles of a serious nature. Moreover, by means of this invention oysters may be opened with little trouble by unskilled persons and in households or restaurants where there is not an experienced oyster-shucker.

The invention consists of an oyster-opening tool constructed as herein set forth and claimed.

Referring to the accompanying drawings, Figure 1 is a side view of the invention. Fig. 2 is a top view thereof. Fig. 3 is a side view opposite that in Fig. 1; and Fig. 4 is a vertical cross-section on the line 4 4, Fig. 1.

The tool is constructed as follows:

1 and 2 are arms hinged together by the pivot-pin 3, forming the handles 5 5 and the short portions 6 7, the whole resembling the lever arrangement of a hand-punch. The short portion 6 is formed at its outer end with a fork-shaped or branched end 8, which may be termed an "anvil" or "rest," extending laterally thereto and to the cutting edge or blade of a combined knife and wedging oyster opener or prier 9, mounted on the other short portion 7 and preferably detachably secured thereto in any suitable manner by means of screws 10, passing through the head of the knife 9 and engaging the short portion 7. By this means the knife 9 may be removed for sharpening or to supply a new one. The knife-blade 9 has its cutting edge located in a plane at right angles and transverse to the anvil or rest and is located on the short arm 7 at an angle inclined and depending inwardly thereto, whereby when the tool is operated the blade will swing and cut along the edge of the oyster between the two shells toward the rear or hinged end thereof. The knife 9 is preferably shaped as follows to permit of the proper operation thereof, as hereinafter set forth: The sides of the knife 9 taper to a comparatively thin edge 11 and also to an oval point 12, which enables the knife 9 to be wedged in between the two shells of the oyster and then in the operation of the tool to cut the ligament or hinge of the oyster-shells. A suitable spring 13, similar to those in hand-punches, is located between the handles 5 5 to hold the same apart.

A suitable knife 14 may be mounted on the arm 2, which can be used to cut the ligament holding the two shells of the oyster together after the opening has been made in the end of the oyster and the hinge cut.

The operation of the tool is as follows: An oyster is held in the left hand and the tool in the right. The open jaws are located at the hinged end 15 of an oyster 16, as shown in dotted lines in Fig. 3, with the anvil or rest 8 resting transversely against the lower edge of the oyster, the notch in the anvil serving to steady the oyster and the edge of the knife 9 at its point resting against the upper edge of the oyster, as shown. Upon pressing the handles 5 5 toward each other the edge of the knife at a single point is inserted between the two shells, and as the pressure is continued the beveled shape of the knife wedges the shells apart. At the same time the knife-edge severs the ligament or hinge of the oyster. By means of the short arms 6 and 7 and the relative position of the anvil and knife on said arms and to each other when the tool is operated the knife will swing in an arc inwardly and across and toward the hinged end of the oyster and will clear the oyster. A clean-cut opening is thereby made at the hinge end of the oyster sufficient for the insertion of a knife-blade, such as the blade 14. Such blade being inserted, the opening made by the tool permits the blade to be operated to cut the remaining ligament which holds the shells together, when they will be entirely detached. In cutting and prying open the hinged end of the oyster as described the edges of the shell are not battered by the operation of the knife 9, but a clean cut and separation is effected, whereby no pieces of shell get into the oyster.

What I claim as new, and desire to secure by Letters Patent, is—

An oyster-opening tool consisting of a pair of hinged lever-arms, each having a short and long leg, an anvil on one of said short legs, and a knife-blade on the other short leg, said blade being mounted thereon at an angle inclined thereto and depending inwardly toward the hinge of the tool as and for the purpose herein set forth.

In testimony whereof I hereunto affix my signature, in the presence of two witnesses, this 24th day of April, 1902.

SILLIMAN BLAGDEN.

Witnesses:
HOWARD A. WHALL,
ELIZABETH HOGAN.